(12) United States Patent
Arning et al.

(10) Patent No.: US 6,954,756 B2
(45) Date of Patent: Oct. 11, 2005

(54) METHOD AND SYSTEM FOR DETECTING DEVIATIONS IN DATA TABLES

(75) Inventors: Andreas Arning, Rottenburg (DE);
Toni Bollinger, Weil der Stadt (DE);
Reinhold Keuler, Dettenhausen (DE);
Friedemann Harald Schwenkreis, Leinfelden-Echterdingen (DE)

(73) Assignee: International Business Machines Corporation, Armonk, NY (US)

( * ) Notice: Subject to any disclaimer, the term of this patent is extended or adjusted under 35 U.S.C. 154(b) by 552 days.

(21) Appl. No.: 09/930,921

(22) Filed: Aug. 16, 2001

(65) Prior Publication Data

US 2002/0049740 A1 Apr. 25, 2002

(30) Foreign Application Priority Data

Aug. 17, 2000 (EP) .......................................... 00117703

(51) Int. Cl.[7] ............................................. G06F 17/30
(52) U.S. Cl. ..................................................... 707/101
(58) Field of Search ...................... 707/1–10, 100–102; 714/46–48

(56) References Cited

U.S. PATENT DOCUMENTS

| | | | |
|---|---|---|---|
| 5,813,002 A | | 9/1998 | Agrawal et al. ................ 707/5 |
| 5,899,992 A | | 5/1999 | Iyer et al. ....................... 707/7 |
| 6,226,620 B1 | * | 5/2001 | Oon ................................ 705/2 |
| 6,230,151 B1 | * | 5/2001 | Agrawal et al. .............. 706/12 |
| 6,321,217 B1 | * | 11/2001 | Maeda et al. ................. 706/47 |
| 6,687,691 B1 | * | 2/2004 | Agrawal et al. ............... 707/6 |

OTHER PUBLICATIONS

IBM Technical Disclosure Bulletin, vol. 40, No. 02, Feb. 1997 entitled "Intelligent Miner" by R. Agrawal et al, paes 121–125.

* cited by examiner

Primary Examiner—Safet Metjahic
Assistant Examiner—Marc R Filipczyk
(74) Attorney, Agent, or Firm—William A. Kinnaman, Jr.

(57) ABSTRACT

A method and system for automatically detecting deviations in a data table comprising a multitude of records and a multitude of columns. A column of the data table is selected as a classification column and a classification tree is calculated with respect to the classification column. Each edge of the classification tree is associated with a predicate. The leaf nodes of the classification tree are associated with a leaf record set comprising the subset of records for which the class predicate comprising all predicates along a path from a root node of the classification tree to the leaf nodes evaluates to TRUE. Leaf nodes are associated with a leaf label representing an expected value in the classification column for the corresponding leaf record sets. From the leaf record sets all records deviating with respect to the corresponding classification column from the leaf label are determined as deviation sets.

20 Claims, 3 Drawing Sheets

FIG. 3B

| age | domicile | gender | income | class-label |
|-----|----------|--------|--------|-------------|
| 21  | rural    | male   | middle | A           |
| 25  | rural    | female | high   | A           |
| 29  | urban    | female | low    | A           |
| 37  | urban    | male   | middle | B           |
| 42  | rural    | male   | high   | A           |
| 49  | rural    | female | middle | B           |
| 57  | urban    | male   | low    | B           |
| 70  | urban    | female | high   | A           |

METHOD AND SYSTEM FOR DETECTING DEVIATIONS IN DATA TABLES

BACKGROUND OF THE INVENTION

1. Field of the Invention

The present invention relates in general to computer databases. More particularly, the present invention relates to a method and system for detecting data deviations in a large database.

2. Description of the Related Art

The importance of detecting deviations or exceptions to data in a database has been recognized in the past, especially in the fields of machine learning and maintaining data integrity in large databases. Deviations are often viewed as outliers, errors, or noise in the data. As a related art, statistical methods have been used for identifying outliers in numerical data. See, for example, "Understanding Robust and Exploratory Data Analysis," D. C. Hoaglin et al., 1983. Typically, these methods first compute the average and standard deviation of the data values in the data set. The data values that lie beyond three standard deviations from the average are considered deviations. However, such detection methods suffer two major limitations. They assume that a metrical distance function exists, and they are only applicable to numerical values.

Another approach to detecting deviations in a database is to use explicit information residing outside the data such as data integrity constraints or predefined error/non-error patterns. Detection methods using integrity constraints are described, for instance, in "Using the New DB2: IBM's Object-Relational Database System," Morgan Kaufman, 1996. As an example of constraint-based detection, assuming that one of the attributes of the data is a person's age, an integrity constraint may be that the value of the attribute age must be less than 90. When this constraint is applied to the data, any person having the age of 90 or more will be detected as a deviation.

For deviation detection methods based on error patterns, an example of the error patterns would be a regular expression of the form [a-z, A-Z]+, meaning that a valid character string consists only of letters. By applying this pattern to the data, one can isolate those strings which do not follow this pattern as deviations. A drawback of this approach is that its success depends on the knowledge of the person specifying the error pattern concerning the target data. Such knowledge must be available to that person from a source external to the data, rather than from the data itself.

Alternatively, the problem of detecting deviations can be considered as a special case of clustering of data. In the case of deviation detection, the data is clustered into two groups: deviations and non-deviations. However, the usual clustering methods are biased toward discarding deviations as noise. Consequently, a direct application of these methods will not yield the desired deviations in the database.

As an example of this limitation, consider a popular clustering algorithm in which k clusters are to be found from the data. The algorithm starts by randomly choosing k points (or data items) as cluster centers and then examines the rest of the data points one after another. For each data point, the algorithm finds the cluster center nearest to the examined data point and assigns it to the corresponding data cluster. Once a data point is assigned to a cluster, the center for that data cluster is recomputed. If this algorithm is used to find two clusters, we are likely to end up with two clusters, each having a concentration of a substantial portion of the data points, rather than two clusters where one contains deviations (a small minority) and the other one contains non-deviations (the large majority). In addition to not yielding desired deviations, another limitation of the clustering methods is that they generally require a metrical distance function.

Another approach to the problem of deviation detection is proposed by A. Arning et al., "Method and System for Linearly Detecting Data Deviations in a Large Database", U.S. Pat. No. 5,813,002. Though this teaching does not require a metrical distance function having certain properties regarding the metrical distance between data elements in the database, it is forced to assume existence of a so-called "dissimilarity" function. For each itemset, defined as a set of one or more data items associated with attribute values, the dissimilarity function allows one to determine its dissimilarity based on a statistical analysis of the attribute values. By tentatively removing all potential subsets from that itemset and determining the influence of this removal on the dissimilarity value the teaching is able to identify deviating data items. However, as admitted by the authors, selection of the particular dissimilarity function is crucial to the success of the proposed method. A priori knowledge seems to be required to select a dissimilarity function in view of the nature of the particular itemset; the authors do not believe in a universal similarity function that works well for all types of itemsets.

Therefore, there remains a significant need for a method for detecting deviations in a database that does not require any a priori knowledge of the database to be analyzed for determining any type of "distance function", "dissimilarity function" or the like.

SUMMARY OF THE INVENTION

The invention is based on the objective to provide an approach to detecting deviations in a large database that does not require a metrical distance function having certain properties regarding the metrical distance between data elements in the database or some type of dissimilarity function allowing one to identify subsets of data items showing a significant dissimilarity in terms of this function with respect to the rest of the data items.

It is a further object of the present invention to provide a deviation detection method that does not rely on explicit information external to the data such as integrity constraints or error/non-error patterns. The result of the method therefore should not depend on the user's knowledge of the data when the constraints or patterns are specified. This implies that the user should not be forced to introduce any type of a priori knowledge with respect to the data items to be analyzed by selecting or adjusting some type of metrical distance or dissimilarity function. Rather, the invention should be able to exploit the implicit redundancy in the data to automatically detect the deviations.

Moreover the proposed invention should not require any type of "preformulated hypothesis", not even as a starting point. The invention therefore should provide a self-adapting teaching that is independent and is able to process any type of data items.

It is yet another object of the present invention to provide a deviation detection method that is able not only to identify data items that deviate in a certain sense from the rest of the data items, but also to provide an explanation of why a particular data item is deviating from the rest. The proposed method should therefore provide a "deeper" insight into the structure of the analyzed data items.

The objectives of the invention are solved by the invention set forth in the independent claims. Further advantageous arrangements and embodiments of the invention are set forth in the respective subclaims.

The present invention relates to means and a method for automatically detecting deviations in a data table comprising a multitude of records and a multitude of columns.

The invention contemplates selecting a column of the data table as a classification column and calculating a classification tree with respect to the classification column. Each edge of the classification tree is associated with a predicate. The leaf nodes of the classification tree are associated with a leaf record set comprising the subset of records for which the class predicate, comprising all predicates along a path from a root node of the classification tree to the leaf nodes, evaluates to TRUE. Moreover, leaf nodes are associated with a leaf label representing an expected value in the classification column for the corresponding leaf record sets. From the leaf record sets all records deviating with respect to the corresponding classification column from the leaf label are determined as deviation sets. The deviation sets are associated with the corresponding class predicates as an explanation for being detected as a deviation.

The current teaching allows one to achieve all the objectives mentioned above. In particular it is most important that no a priori knowledge in the form of any type of metrical distance function or similarity function, or additional external information such as integrity constraints or some type of preformulated hypothesis or the like, be required to execute the proposed teaching. Due to this property the current teaching may be applied to any type of itemset independently of and not knowing the nature of the data to be examined; the teaching is self-adapting with respect to the nature of the itemset.

DESCRIPTION OF THE PREFERRED EMBODIMENT

Figures 1, 2:
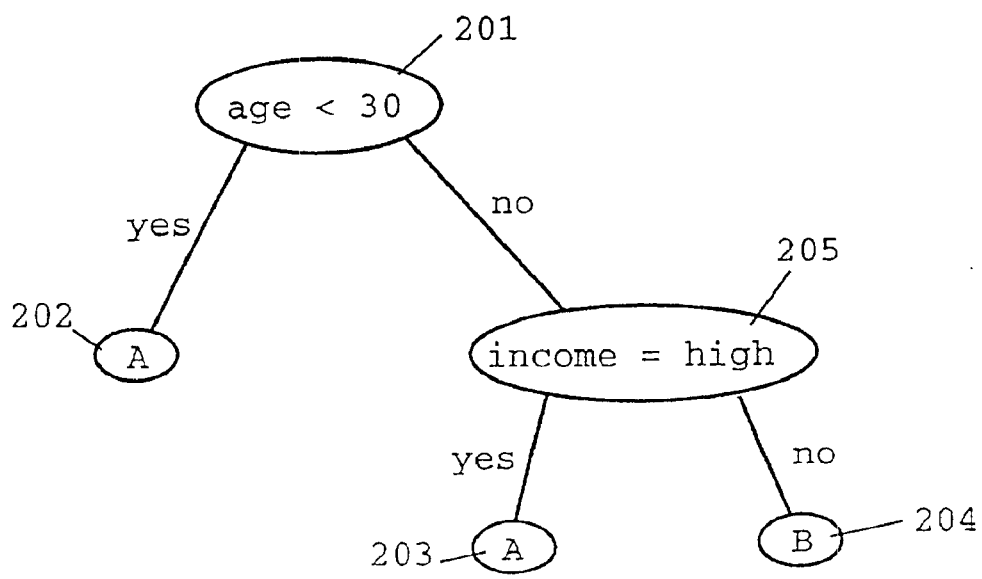
FIG. 1 depicts an example of a simple data table forming the basis for an explanation of the calculation of a classification tree.
FIG. 2 shows the equivalence of a classification tree and the corresponding set of classification rules for the example of FIG. 1.

In the drawings and specification there has been set forth a preferred embodiment of the invention and, although specific terms are used, the description thus given uses terminology in a generic and descriptive sense only and not for purposes of limitation.

The present invention can be realized in hardware, software, or a combination of hardware and software. Any kind of computer system or other apparatus adapted for carrying out the methods described herein is suited. A typical combination of hardware and software could be a general purpose computer system with a computer program that, when loaded and executed, controls the computer system such that it carries out the methods described herein. The present invention can also be embedded in a computer program product, which comprises all the features enabling the implementation of the methods described herein, and which when loaded in a computer system is able to carry out these methods.

Computer program means or computer programs in the present context mean any expression, in any language, code or notation, of a set of instructions intended to cause a system having an information processing capability to perform a particular function either directly or after either or both of the following: a) conversion to another language, code or notation; b) reproduction in a different material form.

Introduction

Databases store a huge number of itemsets; each itemset comprises a set of one or more data items associated with attribute values. For example, a data item in an employee database may have respective values for the attributes job type, age, and salary. In this case, job type is a categorical attribute (or nonnumerical attribute, which may receive a certain value from a discrete set of potential values), while age and salary are numerical attributes. As numerical values always can be mapped to a discrete set of intervals one can without loss of generality assume that all attributes are of the categorical type. Conceptually (also without loss of generality) such itemsets can be viewed as tables wherein the individual records represent the data items and the columns comprise the attribute values of the data items. The terms itemset, data item, data attribute and the terms table, record, column are used interchangeably.

During the past very sophisticated technologies have been developed to analyze such itemsets for determining "hidden rules" or "hidden concepts" implicitly incorporated within the itemset. Meanwhile it turned out that it is of significant importance to establish an understanding of not only the amount of "regularity" followed by the itemset, but also the "exceptional" data items comprised by the itemset. These "exceptional cases" often manifest a "new concept" or require specific attention either by a human being or a specific analysis process.

The current invention therefore targets the problem of finding deviations in columns of arbitrary data tables and pinpointing the corresponding records, i.e. data items.

The basic idea of the current teaching is to exploit an already available data mining technology, the technology of generating classification trees, for the new purpose and the new technical effect of deviation detection. The exploitation for the new purpose requires a specific usage pattern and in addition certain adaptations to the classification technology as outlined below.

Tree Classification

Tree classification is a technique for predicting the values of a categorical field for a record in a data table. This prediction problem can be described as follows:

Given a data table DT with a set of (input) fields IF and a categorical class field CF, the goal is to define a function CLASSIFY that computes or "predicts" the values of the class field CF from the values of the input fields IF.

The technology is used such that an existing database table, called the training set, is used to calculate the classification tree and to discover the classification rules. This classification tree and the underlying classification rules are then used to associate every new record (data item), which has never been seen before, with one class represented by a leaf node of the classification tree.

As an example FIG. 1 depicts a simple data table forming the basis for an explanation of the calculation of a classification tree.

The column "class label" 100 partitions the data into two subsets: those with the label "A" and those with the label "B". Thus class label 100 is used in this example as the class field CF mentioned above, whereas the columns "Age" 101, "Domicile" 102, "Gender" 103 and "Income" 104 are used as input fields guiding the classification process. A classification function must predict the value of the class label field from the values of the age, domicile, gender and income field.

In this simple example it is not difficult to find this function by inspecting the table: as can be seen all customers with an age less than 30 belong to class A. For those who are older than 30 years those with a high income belong to class A as well, all the others belong to class B.

For tree classification this classification function is defined through a "classification tree". For simplifying the specification the description may be restricted to binary classification trees which are trees whose interior nodes have two successor nodes. Without limitation of the current teaching, more general classification tree structures may also be used.

A Binary Classification Tree is a Tree
  1. whose interior nodes are labeled with predicates on the input fields, i.e. combining the values of the input fields IF into a general (logical) predicate to be evaluated for each individual record; and
  2. whose leaf nodes are labeled with a value of the class, called class label. The class label represents the predicted value of that particular record column of those records which are associated with that particular leaf node.

According to the current specification a first descriptive approach—stating that a certain predicate labels or is attached to an interior node with the understanding that, depending on the result of the evaluation of this predicate, a certain edge of the subtree of this particular interior node is to be selected—and a second descriptive approach—stating that a certain predicate labels or is attached to an edge originating from that interior node with the understanding that, in case that particular predicate evaluates to TRUE, this edge is selected—are viewed as synonyms for describing identical situations.

The classification function CLASSIFY(CLT, R) for a classification (sub-)tree CLT and a record R can be defined as follows:
  1. If the root node is labeled with a class value c (i.e., CLT consists of the root node only) then c is returned.
  2. If the root node is labeled with a predicate P, then P(R) is evaluated. If the result is "TRUE" then CLASSIFY (LST, R) is returned, where LST is the left subtree of CLT; in other words the left subtree LST is selected. Otherwise CLASSIFY(RST, R) is returned, where RST is the right subtree of CLT; in other words the right subtree RST is selected.
  3. This procedure is recursively repeated for the tree node at the other end of the edge until that particular node is a leaf node associated with a class label; the particular record is then associated with that leaf node.

It is also possible to map a classification tree to an equivalent set of (logical) rules. Let <L1, ..., Ln, Ln+1> be a path from the root to a leaf node, where Li are the labels of the nodes. This path corresponds to the classification rule $$(P1(R) \text{ AND } P2(R) \text{ AND } \ldots \text{ AND } Pn(R)) \rightarrow \text{class label} = Ln+1$$

with the understanding that Li is the label of node i and, if the predicate Pi=Li evaluates to TRUE, the node labeled with Li+1 is the left successor node of node i and is selected, whereas if the predicate Pi=(NOT Li) evaluates to TRUE the right successor node of node i is selected.

The classification rule can be read like follows: if for a certain record R the AND-connected predicates P1(R) ... Pn(R) evaluate to TRUE, then it is predicted that this particular record stores in its (n+1)-th column the value Ln+1 (the class label of the particular leaf node of the classification tree). Therefore, such a sequence of predicates along a path from the root node of the classification tree to a leaf node can be viewed as a "class predicate"; it specifies the set of all records, that is the class of all records for which this class predicate evaluates to TRUE.

This equivalence of a classification tree and the corresponding set of classification rules is visualized for the example of FIG. 1 in FIG. 2.

FIG. 2 shows a classification tree with a root node 201, leaf nodes 202, 203, 204, and an interior node 205. The root node 201 and the interior node 205 are labeled with predicates (age<30) and (income=high) respectively. Depending on the outcome of the evaluation of a certain predicate, for instance that of node 205, the left edge ending in the leaf node 203 is selected if the predicate evaluates to TRUE; otherwise the right edge will be selected ending in the leaf node 204.

The path<(age<30), (income=high), A> is a path from the root to a leaf node. It corresponds to the classification rule:

$$\text{NOT(age<30) AND (income=high)} \rightarrow \text{class label}=A$$

The current invention further introduces a so-called purity value to measure the degree of conformity of all records associated with a certain class, or in other words all records associated with a certain leaf node. Of course a multitude of different approaches to define such a purity measure are possible. A measure which turns out to be easily calculated and at the same time is very effective is the following: the purity of a leaf node for a given data table with input fields IF and class field CF is defined as the confidence of its corresponding classification rule; i.e., if L is a leaf node, $$(P1(R) \text{ AND } P2(R) \text{ AND } \ldots \text{ AND } Pn(R)) \rightarrow \text{class label} = Ln+1$$

is its classification rule (its class predicate) and DT' is the set of records R where (P1(R) AND P2(R) AND ... AND Pn(R)) is TRUE, then $$\text{purity}(L) = [\text{number of records } R' \text{ in } DT' \text{ where } CF(R') = Ln+1)] / [\text{number of all records in } DT']$$

is an effective purity measure for calculating a purity of all values.

Referring to the example of FIG. 2 above the purity values for the various leaf nodes, that is the confidence value of the classification rules, is 100% as the various leaf nodes comprise only records which coincide with the individual leaf labels.

The algorithms for constructing a classification tree usually start with the root node and expand successively and recursively to the leaf nodes until a stop criterion is met. Such a criterion may be based on the purity of the node or on the number of records covered by or associated with a leaf node. The main problem is to find the appropriate predicates for the interior nodes. Usually these predicates involve tests on a single field, for categorical fields they may check whether the value belongs to a certain subset of the value range of that field, for numeric fields it can be a test if the value is below a certain value. Each predicate splits the input data table into two parts (in the special case of binary classification trees): one where the predicate evaluates to true and the complement where it evaluates to false.

The task is to find the predicate that performs the best split for predicting the class label value. The splits are evaluated on the basis of the distributions of the class field values in both parts. The most common measures for the split decision are the Gini index and the entropy measure.

More formally the classification algorithm can be described as follows by using the following auxiliary functions:
1. class-label(DT) which returns the class label value associated with the data table DT; this can be the value of the class field with the highest frequency.
2. expand-node(DT) which returns TRUE, if the label should be expanded according to anyone of the state of the art measures (like for instance the above mentioned Gini index or the entropy measure).

For a data table DT with input fields IF and class field CF the function compute_classification_tree(DT, IF, CF) returns a classification tree. It is defined as follows:
compute_classification_tree(DT, IF, CF): Return the tree computed by expand_tree(root-node, DT, IF, CF), with the definition of expand_tree(N, DT, IF, CF):
1. If expand-node(DT, CF)=FALSE then label node N with class-label(DT) and return the tree consisting of N only.
2. Find a predicate P based on the input fields IF that performs the best split of DT into subtables DT1 and DT2, which each comprise a subset of the records of table DT. Label N with P and create the two successor nodes of N "left node" and "right node". Create left-tree=expand_tree(left-node, DT1, IF, CF) and right-tree=expand_tree(left-node, DT2, IF, CF).

Further create the tree consisting of N as the root node and left-tree as the left subtree and right-tree as the right subtree and return this tree.

Exploitation of Tree Classification and Further Enhancements for Deviation Detection As already pointed out above the proposed method detects deviations within an itemset by applying the powerful technique of tree classification. But in contrast to the state of the art knowledge the classification methods are called in a different way than usual tree classifiers, they generate different output than usual tree classifiers and postprocess the output in a different way than usual. In addition further modifications to the tree classification algorithms are required.

The input for the proposed method is a data table DT with categorical columns (without limitation of generality this always can be assumed to refer to the discussion above) and optionally additional numerical columns. The method is able to find deviations in the categorical columns. Output from the method is one or more set(s) of records (called the deviation sets) of the input table DT, each set tagged with an expected (but not present) value in a categorical column, together with the rule why this value was expected as an explanation providing a deeper insight into the inherent data structure.

Within the context of the method for detecting deviations the purity measure introduced for the tree classification technology above will be enhanced one step further. From a theoretical perspective traditional tree classification techniques try to ignore infrequently occurring potential label values in the records associated with the individual leaf nodes of the classification tree (the ideal target would be a purity value of 100%). For example, so-called "pruning techniques" are used which do simplify a tree (by replacing a subtree by a leaf node) in order to avoid overfitting. Thus, traditional tree classification techniques make no difference between a leaf node with a purity of 100% and a purity of (100−ϵ)%, e.g. 99.9999999%. In contrast to that the current teaching tries to focus on purity values of the leaf nodes somewhat below a perfect match, that is a purity value somewhat below 100%, but will ignore leaf nodes with a purity of 100%; those records leading to a purity value deviating from the 100% conformity represent the important records the method is trying to determine. The proposed method tries to calculate the classification tree in such a manner that there are not too many deviating records associated with each leaf node. For that purpose a purity threshold can be used as an additional stop criterion for the recursive expansion of a subtree; for example, when a purity threshold of 99.9% is selected by the user, the method may stop expanding a node to a subtree whenever less than 1000 records (for instance) are associated with the node, since for less than 1000 records each split will result in nodes with a purity of either 100% or less than 99.9% (999/1000). More precisely, in this example one can even stop expanding a tree node as soon as none of the occurring class field values does occur at least 1000 times, so e.g. 950 "Y", 850 "N" and 500 "?" occurrences cannot be split to any node with a purity of at least 99.9% but not 100%.

Depending on a purity threshold PT the result can be that no deviating records for a certain leaf node can be determined. It has to be stressed that in the field of deviation detection this does not mean a failure; this outcome means "No deviation found by this method", which is a valid and nontrivial outcome of the method.

Figure 3A:
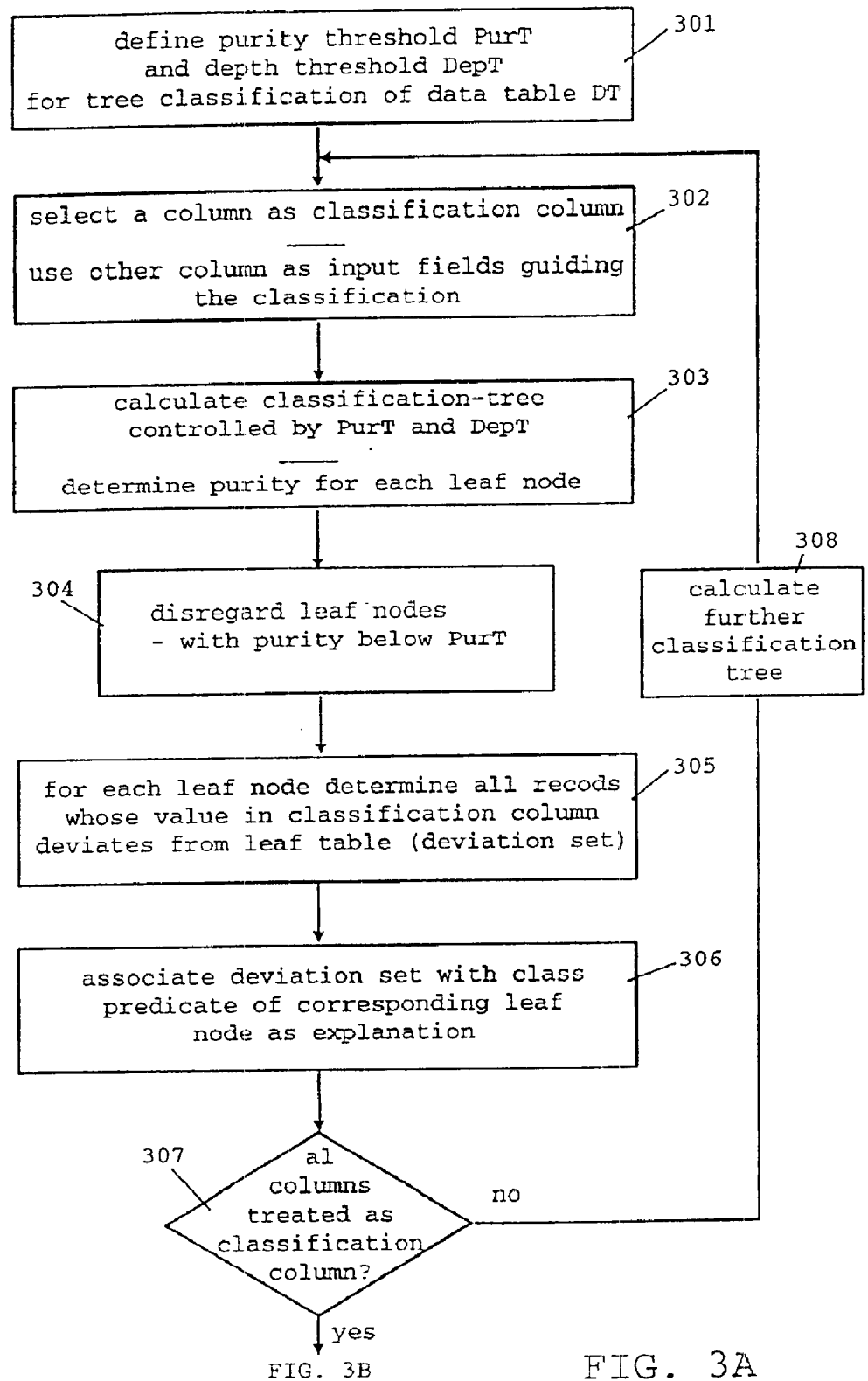
FIG. 3 (comprising FIGS. 3A–3B) portrays an overview of the proposed method for detecting deviations in a data table.
Figure 3B:
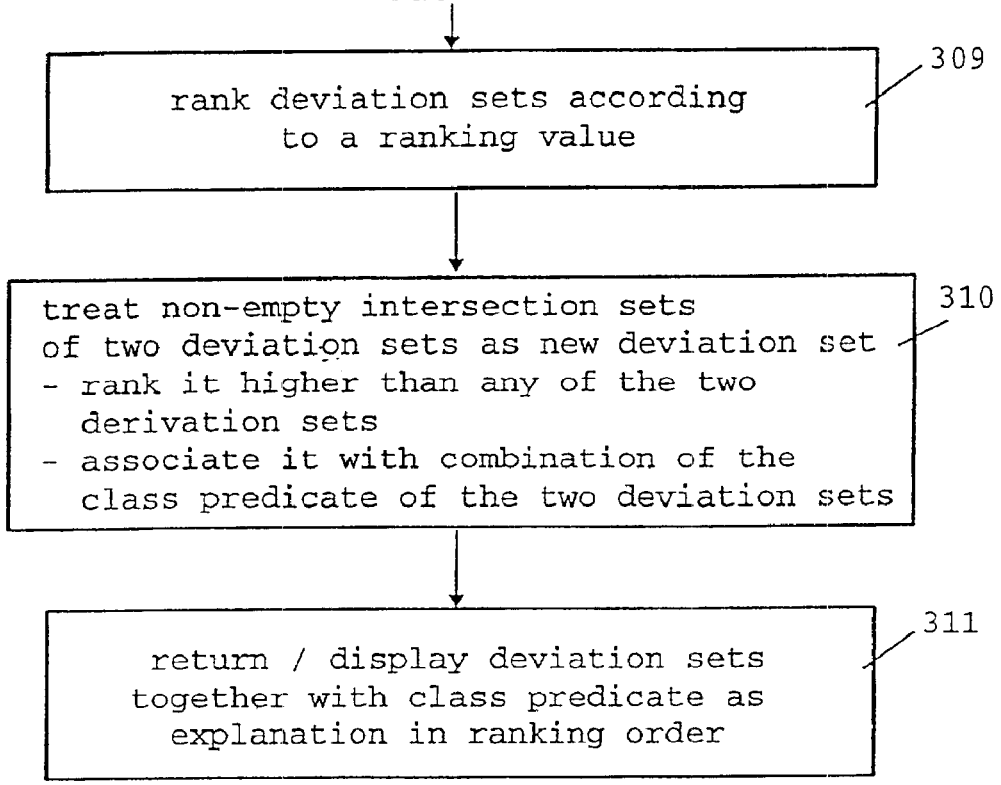

FIG. 3 portrays an overview of the proposed method for detecting deviations in a data table.

Step 301: Within this step 301 the user can provide the data table DT to be inspected. In addition the user may provide a purity threshold PurT (e.g. 80%, 90%, 95%, 99%, 99.999%) and a depth threshold DepT (e.g. 2, 3, 5). Usage of these optional thresholds provides an additional advantage to specifically adapt the tree classification methodology especially for its exploitation with respect to deviation detection.

Steps 302 up to 306: These steps are executed within a loop iterated over all categorical columns of the table. A multitude of classification trees are calculated using the individual categorical columns as classification targets.

Step 302: In this step a certain column is selected as a classification column. All the other columns of that data table are used as input fields. On the basis of the values of these input fields the classification methodology tries to predict the values in the selected classification column.

Step 303: Using the values within the input fields to guide the classification process a classification tree is calculated. The leaf nodes of the resulting classification tree are associated with disjunctive subsets of the set of records comprised by the data table; we call this subset the leaf record set. The predicates calculated by the classification methodology along the path from the root node to a leaf node represent a class predicate. For all records within the leaf record set the class predicate evaluates to TRUE based on the values of the input fields. The class label associated with a leaf node is the predicted value for the value of the classification column. According to the classification methodology's view all records within a leaf record set form a certain class or category.

According to the current invention an unpruned classification tree with limited tree depth DepT is calculated with respect to the classification column. As it turns out the greatest advantages are achieved by the current teaching if the depth of the classification tree is bound by the depth threshold DepT. This can be understood from several perspectives. First, classification technology according to the state of the art has a strong tendency for a great selectivity;

due to a large number of predicates along the path from the root node to the leaf node (this directly corresponds to a great depth of the classification tree). Leaf record sets are associated with the leaf nodes which in many cases only consist of records whose value in the classification column matches the computed class label. As the approach of the current invention is directed to deviation detection the limitations of the tree depth prove to be an effective technique to permit a controlled amount of unconformity or inhomogeneity of the leaf record set. Second, limitation of the tree depth directly corresponds to the size (length) of the class predicate. As later on the class predicate is used as an explanation for the deviating records, short and therefore much more conceivable explanations are achieved if the number of predicates comprised by the class predicate is limited to a small number. A preferable tree depth threshold is 5. From psychological tests it is known that the optimal number of different "entities" a human mind is able to handle from the point of complexity is the number 3. Therefore, the explanation generated according to the current invention is viewed as optimal if it comprises not more than three predicates, which corresponds to an optimal tree depth of 3.

Step 304: A further optional extension of the current invention relates to measuring the purity of the leaf nodes of the calculated classification tree; or in other words the extension relates to the purity of the leaf record sets. If the purity value of a leaf node is very low this corresponds to a large amount of inhomogeneity. In such a situation one cannot expect any deeper insight in some common reason for the occurrence of deviating records. Disregarding leaf nodes with a purity value below the purity threshold PurT allows one to neglect deviating records which are too inhomogeneous.

Of course leaf nodes with a purity of 100% can be ignored as this corresponds to a situation where no deviating records are associated with such leaf nodes.

In essence the combination of the tree depth threshold and the purity threshold allows one to guide the tree classification to filter out the most interesting deviation records. These thresholds allow one to suppress deviation sets showing such a significant amount of inhomogeneity that due to the statistical distribution of the attribute values no commonality of the deviating records can be established.

Step 305: Within step 305 for each tree node the generated tree is applied to find the records of the data table that fall into this tree node but do not have the class label value which is attached to the tree node; i.e. for each leaf node all records whose value in the classification column deviates from the leaf label (they represent the deviation set) are determined.

Step 306: In addition within step 306 the deviation sets are associated with the class predicate of the corresponding leaf nodes; the class predicate represents an explanation (in terms of logical predicates) why these records have been identified as deviating records. The explanation can be read in the following manner: "All records within the deviation set satisfy the class predicate but contrary to the expectation they do not match the class label of the leaf node".

Step 307: Within step 307 it is tested whether for all columns of the data table a classification tree has been calculated already. If it turns out that there are further columns left then additional classification trees are calculated along the path 308 by repeating the process of calculating a classification tree. Otherwise the proposed teaching continues with step 309.

Step 309: Within step 309 for all deviation sets of all classification trees a ranking value is determined and the deviation sets are ordered in a sequence according to their ranking values.

Potential ranking measures used to calculate a ranking value may be based on a multitude of different functional relationships between a multitude of different parameters. Any one or any combination of the following parameters is suggested for establishing a ranking measure:

1. the purity value of the associated leaf node;
2. the total number of records associated with a leaf node;
3. the length of a class predicate of a leaf node.

As a ranking measure which does not require any additional computing effort the purity of a deviation set can be used. Thus the purity value of a deviation set is interpreted as its ranking value.

Step 310: If deviation sets overlap (for example record R occurs in the two deviation sets D1 and D2), a new deviation set (D1, 2 containing R) is created and ranked higher than each of the original deviation sets (D1 and D2). As an explanation and class predicate for the new deviation sets the explanations from the original deviation sets D1 and D2 are combined by combining or "concatenating" the original clause predicate of D1 and D2 into a combined class predicate of the newly created deviation set.

Step 311: As a final step 311 the sorted list of deviation sets of records, together with the explanation for each deviation set of what value was expected in what column and the rule why it was expected, is returned as output of the proposed methodology of the current invention. This output can be either returned to another program for further processing or displayed on any graphical user interface for further analysis by a human user.

General Remarks:

a. All the data generated during execution of the classification methodology, like the classification tree, the leaf nodes, the leaf labels, the predicate, the class predicate, the deviation sets, the various purity and ranking values and so forth, is stored within computer memory for common usage throughout the whole teaching.

b. Certain tree classification approaches perform various sorting steps with respect to the columns of the data table as a kind of preprocessing. These sorting results are then used during the actual calculation of the classification tree for performance improvements. As according to the current teaching a multitude of classification trees are calculated it is beneficial to generate these sorting results as the first step of the proposed method and to commonly reuse these sorting results for each individual classification tree calculation. This leads to a significant performance gain.

c. A further remark relates to the property of being a leaf node or being treated as such. Each internal node of a certain classification tree can also be considered as a leaf node of another tree with smaller depth by "reducing" the subtree of this internal node into a leaf node. Instead of generating all possible trees with increasing depth, one can as well produce just the tree with maximal desired depth and treat all or selected internal nodes as if they were leaf nodes instead: compute purity, compute the deviation sets, etc. Therefore, the nature of being a leaf node is a dynamic aspect which depends on the various points of view.

d. If the maximum tree depth is higher than 2, leaf nodes can have a class predicate consisting of two or more predicates. Furthermore, it is even possible that two or more predicates contain the same variable and thus one predicate subsumes another one (e.g. "age>18 and age>21"). In this case, the predicate may be simplified (e.g. to "age>21") to improve the quality of the explanation.

e. Generally, the purity threshold serves as a filter to suppress non-significant deviations. However, if the classification column has a very skewed distribution (for example 98% "Yes", 2% "No"), already the root node may come close to the specified purity threshold (e.g. 99%). In this case, there is an especially high probability of finding a leaf node with high purity, but this high purity does not represent a high significance of the deviations. Thus, for attributes with skewed distribution one can automatically use a higher purity threshold than for non-skewed attributes. It is thus suggested to dynamically adjust (in contrast to the more static usage of the purity threshold as explained above) this measure in case of a skewed distribution.

f. A further embodiment of the current invention relates to the ranked presentation of the deviation sets. In a first improvement it is suggested that the current method's user interface collect user feedback for interesting/uninteresting deviations and exploit this feedback when doing another ranked presentation in the future. As a second improvement all visualized deviations of a current run could be considered as "known" in future runs and thus be suppressed in the output of future executions of the method; thus, each execution of the proposed method will focus only on those deviations, which have been detected in addition to the deviations of previous executions of the method.

g. A further (optional) embodiment of the current invention relates to a more sophisticated purity threshold handling.

In most scenarios, the method will rank small deviation sets especially high. But in other cases it might be adequate to flag only deviation sets of minimum cardinality, i.e. ignore those deviation sets that are too small. This can be achieved by introduction of a second purity threshold PurT2 in addition to the purity threshold (referred to as the first purity threshold in the following) PurT discussed above.

The background for this further embodiment is that leaf nodes above a second purity threshold PurT2 might not lead to interesting results if the purity is so large that only very few records deviate from the predicted leaf label. By disregarding all the leaf nodes with a purity value of the second purity threshold PurT2 and above these records contributing to this very small amount of inhomogeneity can be neglected as uninteresting exceptional cases. Or in other words, through the second purity threshold PurT2 it is possible to prevent detection of very few records only, which in most cases would represent only singular records not establishing any general concept incorporated within the data table.

This more sophisticated purity threshold handling could be implemented by defining in step 301 of FIG. 3 the second purity threshold PurT2>PurT and disregarding leaf nodes in step 304 with a purity equal to or greater than the second purity value PurT2. In case the second purity threshold is set to PurT2=100% this enhanced embodiment coincides with the methodology as described above.

A similar effect can also be achieved by modifying the ranking of the resulting deviations accordingly.

As can be seen from the foregoing description the proposed teaching is a self-adapting procedure to extract interesting deviating records from a data table. It is most important that no a priori knowledge in the form of any type of metrical distance function, similarity function, additional external information like integrity constraints or some type of preformulated hypothesis and the like is required to execute the proposed teaching. This property is essential to apply the teaching to any type of data table (itemset) independently of and not knowing the nature of the data to be examined.

What is claimed is:

1. A computerized method for detecting deviations in a data table comprising a plurality of records and a plurality of columns, said method comprising the steps of:
   (1) selecting a column as a classification column;
   (2) executing a classification method for calculating a classification tree with respect to said classification column, whereby each edge of said classification tree is associated with a predicate, whereby a leaf node of said classification tree is associated with a leaf record set comprising a subset of records for which a class predicate comprising all predicates along a path from a root node of said classification tree to said leaf node evaluates to TRUE, and whereby said leaf node is associated with a leaf label representing an expected value in said classification column of said leaf record set; and
   (3) determining from said leaf record set all records deviating with respect to said classification column from said leaf label as a deviation set.

2. The method of claim 1 wherein said deviation set is associated with said class predicate in said determining step as an explanation for being detected as a deviation.

3. The method of claim 1 wherein a plurality of leaf nodes are calculated in said executing step and wherein said determining step is executed for each of said plurality of leaf nodes.

4. The method of claim 3 wherein for each leaf node a purity value is determined, said purity value measuring a degree of conformity of an associated leaf record set with respect to said leaf label of said leaf node.

5. The method of claim 4 wherein said purity value is based on a percentage of the number of records of said leaf record set not coinciding with said leaf label.

6. The method of claim 4 wherein leaf nodes and their associated leaf record set with a purity value indicating a conformity below a predefined first purity threshold are disregarded.

7. The method of claim 6 wherein leaf nodes and their associated leaf record set with purity values indicating a conformity above a predefined second purity threshold are also disregarded.

8. The method of claim 7 wherein said purity thresholds have values between 80% and 100%.

9. The method of claim 1 wherein in said executing step said classification tree is limited to a depth not exceeding a predefined depth threshold.

10. The method of claim 9 wherein said depth threshold is a number not exceeding 3.

11. The method of claim 1 wherein said method is iterated by repeatedly executing said method for another column of said data table as a classification column.

12. The method of claim 1 wherein for each leaf node and its corresponding deviation set a ranking value is determined and wherein said deviation sets are ordered in a sequence according to their ranking values.

13. The method of claim 12 wherein said ranking value is determined based on a purity value of a leaf node.

14. The method of claim 12 wherein said ranking value is determined based on a number of records associated with a leaf node.

15. The method of claim 12 wherein said ranking value is determined based on a length of the class predicate of a leaf node.

16. The method of claim 12, wherein for each pair of first and second deviation sets with a non-empty intersection set, said intersection set is treated as a third deviation set with a ranking value higher than a ranking value of said first and second deviation sets and said third deviation set is associated with a class predicate comprising the combination of the class predicates of said first and second deviation sets.

17. The method of claim 1 wherein, if said data table has been modified after said method has been executed in a first run, the following further steps are performed:

executing said method in a second run with respect to the modified data table;

determining said deviation set of said modified data table; and reducing said deviation set by said deviation set of said first run.

18. A computer system for detecting deviations in a data table comprising a plurality of records and a plurality of columns, said system comprising means for carrying out the steps of the method of claim 1.

19. A data processing program for execution in a data processing system comprising software code portions for performing the method of claim 1 when said program is run on a computer.

20. A computer program product stored on a computer usable medium, comprising computer readable program means for causing a computer to perform the method of claim 1 when said program is run on said computer.

* * * * *